US011954213B2

United States Patent
Fong et al.

(10) Patent No.: US 11,954,213 B2
(45) Date of Patent: Apr. 9, 2024

(54) OBFUSCATING INTELLIGENT DATA WHILE PRESERVING RESERVE VALUES

(71) Applicant: International Business Machines Corporation, Armonk, NY (US)

(72) Inventors: Kin Fong, Saint Paul, MN (US); Matthias Seul, Pleasant Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 17/474,035

(22) Filed: Sep. 13, 2021

(65) Prior Publication Data

US 2023/0078607 A1    Mar. 16, 2023

(51) Int. Cl.
G06F 21/62    (2013.01)
G06F 16/35    (2019.01)

(52) U.S. Cl.
CPC .............. *G06F 21/62* (2013.01); *G06F 16/35* (2019.01)

(58) Field of Classification Search
CPC .................... G06F 21/60–645; G06F 16/35
See application file for complete search history.

(56) References Cited

U.S. PATENT DOCUMENTS

| | | | |
|---|---|---|---|
| 7,644,127 B2 * | 1/2010 | Yu | H04L 51/212 709/206 |
| 8,347,396 B2 | 1/2013 | Grigsby | |
| 10,181,050 B2 | 1/2019 | Curtis | |
| 10,200,331 B2 | 2/2019 | Ebner | |
| 10,430,610 B2 | 10/2019 | Davis | |
| 10,650,164 B2 | 5/2020 | Gouget | |
| 10,860,732 B2 | 12/2020 | Guirguis | |
| 10,944,545 B2 | 3/2021 | Wiener | |
| 10,977,269 B1 | 4/2021 | Kurtic | |
| 11,017,320 B1 | 5/2021 | Kim | |
| 2008/0091944 A1 * | 4/2008 | von Mueller | G06Q 20/12 713/168 |
| 2018/0276402 A1 * | 9/2018 | Allen | G06F 21/6263 |
| 2019/0354716 A1 | 11/2019 | Basava | |
| 2020/0034573 A1 | 1/2020 | Pulkus | |
| 2020/0042677 A1 | 2/2020 | Zwanzger | |
| 2020/0265155 A1 | 8/2020 | Dong | |
| 2020/0302968 A1 | 9/2020 | Chantz | |

(Continued)

FOREIGN PATENT DOCUMENTS

CA    2888560 A1    6/2015
WO    2008039565 A2    4/2008

OTHER PUBLICATIONS

"Breakthrough data-centric security technology," Micro Focus, accessed Feb. 4, 2021, 10 pages. <https://www.microfocus.com/en-us/products/voltage-data-encryption-security/how-it-works>.

(Continued)

*Primary Examiner* — Madhuri R Herzog
(74) *Attorney, Agent, or Firm* — Jared C. Chaney

(57) ABSTRACT

A system may receive a string of characters, identify two or more sub-strings of the string, compare the two or more sub-strings to one or more reserve values from a database of reserve values, identify a first sub-string of the two or more sub-strings that contains one of the one or more reserve values, identify a second sub-string of the two or more sub-strings with a sensitive value, and obfuscate the second sub-string and not obfuscating the first sub-string.

14 Claims, 2 Drawing Sheets

(56) References Cited

U.S. PATENT DOCUMENTS

| | | | |
|---|---|---|---|
| 2022/0058277 A1* | 2/2022 | Ojima | G06F 21/62 |
| 2022/0222372 A1* | 7/2022 | Larson | G06N 20/00 |
| 2022/0253744 A1* | 8/2022 | Sloane | G06N 20/00 |

OTHER PUBLICATIONS

"IBM InfoSphere Optim Data Masking solution," IBM Software, accessed Sep. 13, 2021, 6 pages. <https://www.ibm.com/downloads/cas/JGE5XOYY>.

"Partial Masking," DataVeil Technologies, accessed Feb. 4, 2021, 3 pages. <https://www.dataveil.com/partial-masking/>.

Al-Hakimi et al., "Hybrid Obfuscation Technique to Protect Source Code from Prohibited Software Reserve Engineering," IEEE Access, Oct. 2, 2020, 17 pages.

Chakraborty et al., "Embedded Software Security Through Key-Based Control Flow Obfuscation," InfoSecHiComNet 2011, LNCS 7011, pp. 30-44.

Glanz et al., "Hidden in Plain Sight: Obfuscated Strings Threatening Your Privacy," Asia CCS '20, Oct. 5-9, 2020, 14 pages.

Jang et al., "Partial image encryption using format-preserving encryption in image processing systems for Internet of things environment," International Journal of Distributed Sensor Networks, vol. 16(3), Mar. 3, 2020, 17 pages. <https://journals.sagepub.com/doi/full/10.1177/1550147720914779>.

Wu et al., "Mimimorphism: A New Approach to Binary Code Obfuscation," CCS'10, Oct. 4-8, 2010, 11 pages.

Zhang et al., "Privacy-Preserving Machine Learning through Data Obfuscation," arXiv:1807.01860v2 [cs.CR], Jul. 13, 2018, 12 pages.

* cited by examiner

OBFUSCATING INTELLIGENT DATA WHILE PRESERVING RESERVE VALUES

BACKGROUND

Aspects of the present disclosure relate to obfuscation of data, more particular aspects relate to obfuscating intelligent data while preserving reserve values.

Using intelligent data, several embedded values may be contained in a single string of characters. The embedded data may contain general information that is applicable to a broad swath of strings and specific data that is applicable to only the string in which the embedded data appears.

BRIEF SUMMARY

The present disclosure provides a method, computer program product, and system of obfuscating intelligent data while preserving reserve values. In some embodiments, the method includes receiving a string of characters, identifying two or more sub-strings of the string, comparing the two or more sub-strings to one or more reserve values from a database of reserve values, identifying a first sub-string of the two or more sub-strings that contains one of the one or more reserve values, identifying a second sub-string of the two or more sub-strings with a sensitive value, and obfuscating the second sub-string and not obfuscating the first sub-string.

Some embodiments of the present disclosure can also be illustrated by a computer program product comprising a computer readable storage medium having program instructions embodied therewith, the program instructions executable by a processor to cause the processors to perform a method, the method comprising receiving a string of characters, identifying two or more sub-strings of the string, comparing the two or more sub-strings to one or more reserve values from a database of reserve values, identifying a first sub-string of the two or more sub-strings that contains one of the one or more reserve values, identifying a second sub-string of the two or more sub-strings with a sensitive value, and obfuscating the second sub-string and not obfuscating the first sub-string.

Some embodiments of the present disclosure can also be illustrated by a system comprising a processor and a memory in communication with the processor, the memory containing program instructions that, when executed by the processor, are configured to cause the processor to perform a method, the method comprising receiving a string of characters, identifying two or more sub-strings of the string, comparing the two or more sub-strings to one or more reserve values from a database of reserve values, identifying a first sub-string of the two or more sub-strings that contains one of the one or more reserve values, identifying a second sub-string of the two or more sub-strings with a sensitive value, and obfuscating the second sub-string and not obfuscating the first sub-string.

DETAILED DESCRIPTION

Figure 1:
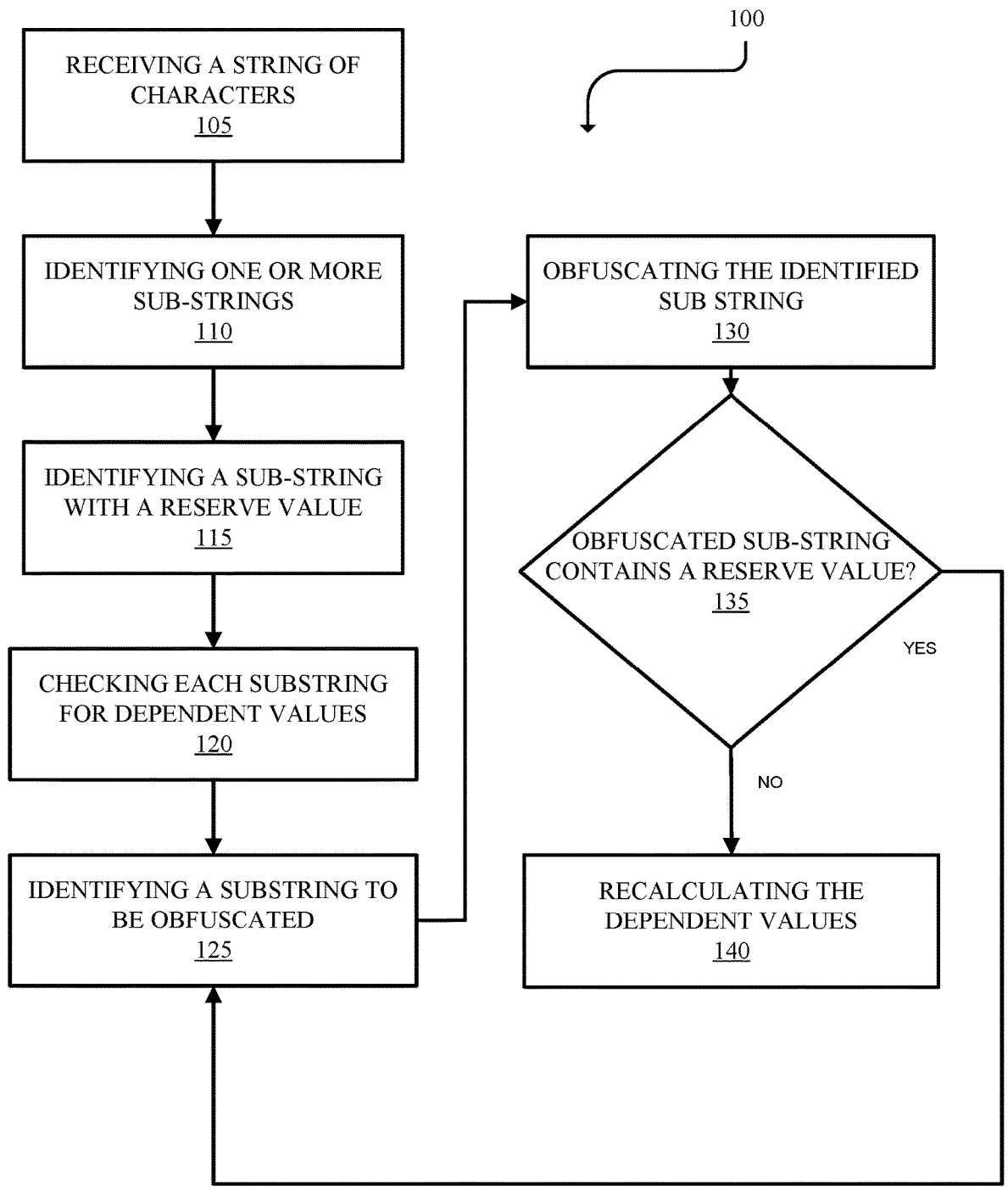
FIG. 1 illustrates an example method of obfuscating intelligent data while preserving reserve values, according to various embodiments of the present disclosure.

Aspects of the present disclosure relate to obfuscating intelligent data while preserving reserve values. While the present disclosure is not necessarily limited to such applications, various aspects of the disclosure may be appreciated through a discussion of various examples using this context.

It is common for intelligent data, such as intelligent account numbers, to be used in place of long sets of data with multiple entries. Intelligent data may include data with different levels of sensitivity. For example, an intelligent account number may indicate a social security number, an institutional identifier, an originating branch, a checking account, and a savings account, among other information. Some intelligent data may have embedded values to convey or hold special meaning or codes. For example, a bank may encode a branch number, product code, and/or other information into various parts of an account number. A credit card number is a simple example of intelligent data where the prefixed values indicate the credit card vendor.

In some instances, it may be required to obfuscate sensitive values (e.g., for security reasons) while preserving the format and some of the codes embedded in intelligent data. As used herein, sensitive values are obfuscated if some or all of the sensitive data within the sensitive values is difficult or impossible to consume by an unauthorized party following the obfuscation. For example, a bank may use production data in test environments, but it is desirable to obfuscate their account numbers while preserving the embedded values and the functionality that goes with the embedded values, such that following obfuscation the account numbers are scrambled, removed, replaced with a non-sensitive placeholder, or the like. For example, consider a picture or image represented by a string of characters, bytes, or bits. The picture could be an image of objects like a person, check, driver license, a place, or other sensitive information that needs to be protected throughout storage or transmission. The string could have portions or sub-strings that contain identifying or descriptive information of the image that are to be preserved for searches while the picture itself is to be obfuscated or encrypted for security reasons. In some cases, simply obfuscating the entire number destroys the functionality of the numbers and therefore limits the usefulness of running tests on real data sets that are obfuscated because reserve values (which may include values that are not sensitive but are helpful/required for evaluating/testing the data) are obfuscated with sensitive data. Therefore, in some embodiments, a system is proposed for obfuscating sensitive values in intelligent data while preserving reserve values.

In some instances, the intelligent data may be a string of characters including alpha-numeric, special, printable and/or non-printable characters. The sub-strings can be any group of one or more characters in the string. For example, the sub-string may be the first three characters in a string, the last three characters in a string, or three characters somewhere in the middle of a string (though sub-strings as discussed herein are not limited to three characters but rather may be any length that is consistent with the disclosure). Depending on the system the characters may need to be in consecutive order, reverse consecutive order, or any order. In some instances, strings may be read left to right, right to left, inside to outside, etc. Intelligent data may have many different formats. For example, in the string OIN51469IHGFURE45186, the sub-string "IHG" may indicate that the next four characters may be an account type no matter where IHG appears in the string as long as there are four characters following IHG.

In some embodiments, by partitioning a string into a number of contiguous sub-strings, within which reserve values or non-reserve values might wholly be contained, a determination can be made if a sub-strings should be obfuscated. For example, if a sub-string contains a reserve value it may not be obfuscated (where not obfuscating values includes doing nothing to scramble/remove/replace values, such that not obfuscating values essentially means leaving values as-is without changing their values or presentation), but if it contains private information, it may be obfuscated. In some embodiments, the method described herein may replace any obfuscated value that happens to equal a reserve value with an available value from a list of values that have been determined not to include a reserve value In some embodiments, the system may determine if the obfuscated value of a non-reserve value happens to be a reserve value in the given sub-string. If the obfuscated value of a non-reserve value happens to be a reserve value in the given sub-string, the system may obfuscate the value again. The system may iteratively look up the obfuscated value and obfuscate it again until a non-reserve value is generated by the obfuscation. The resulting value may be used as the final obfuscated value for the given sub-string.

FIG. 1 depicts an example method 100 for obfuscating intelligent data while preserving reserve values. Operations of method 100 may be enacted by one or more computer systems such as the system described in FIG. 2 below.

Method 100 begins with operation 105 of receiving a string of characters. For example, the system may receive a ten-character string.

Method 100 continues with operation 110 of identifying one or more sub-strings of the string. In some embodiments, the sub-strings may be provided. For example, for a ten-character sub-string, the first three characters may be a first sub-string, the next six characters may be a second sub-string, and the last character may be a third sub-string.

In some embodiments, operation 110 may be run in conjunction with identifying reserve values in the string. Following the example above, the string of characters may be evaluated to determine if it contains one or more reserve values, and the determination may be used to select one or more sub-strings. For example, in a ten-character string 1234567898, 345 may be determined to be a reserve value. Thus, the string may be divided into three sub-strings: a first sub-string 12, a second sub-string 345, and a third sub-string 67898. In some instances, there may be multiple reserve values in a single string. In some embodiments, the string of characters may be evaluated to determine if it contains one or more dependent values, and the determination may be used to select one or more sub-strings. Following the example from above, the last character 8 may be a modulo 10, with a weighting 3, value calculated from 6789. Thus, the string may be divided into four sub-strings; a first sub-string 12, a second sub-string 345, a third sub-string 6789, and a fourth sub-string 8. In some instances, the system may receive or have access to a list or database of reserve values that may be used to find one or more reserve values in operation 110 or 115 below. For example, the database of reserve values is a list of known reserve values that may be included in the string.

In some embodiments, rules may be provided to the system on how to divide the string into sub-strings. In some instances, there may be one or more rules detailing a number of characters for each sub-string based on the number of characters in the string. For example, for a string of 13 characters the first four characters are a first sub-string, the next four characters are a second sub-string, and last 5 characters are a third sub-string, whereas conversely if the string is 8 characters long the first two characters may be a first sub-string and the next 6 characters may be a second sub-string. In some instances, there may be special characters that identify strings. For example, in the string x123b452c455, a letter may denote the beginning of a new string (e.g., sub-string x123, b452, or c455).

In some instances, two defined sub-strings, with or without a reserve value, may be totally overlapping in position. The two defined sub-strings would be replaced with a new sub-string in the same position and having any and all reserve values from the two original sub-strings.

In some instances, two defined sub-strings, with or without a reserve value, may be partially but not totally overlapping in position. For example, in the string AXBB, a first sub-string may be AX (first two positions) and the second sub-string XBB (the last three positions) with the "X" in the overlapping second position. In this instance, if the non-overlapping portions are small (for example, 1 or 2 characters in length) the two input defined sub-strings may be replaced with a new union "superset" sub-string. In the above example, the superset sub-string may be AXBB (all four positions). This new superset sub-string will have reserve values consisting of any reserve values in the first two positions (associated with the first input defined sub-string) followed by all possible values in the last two positions, as well as any reserve values in the last three positions (associated with the second input defined sub-string) preceded by any possible values in the first two positions.

In some instances, forming a superset sub-string may reduce the available number of random unique obfuscated values for the original input data as well as effectively increasing the number of reserve values by keeping the superset sub-string with more reserve values that will not be obfuscated.

In some instances, two defined sub-strings, with or without a reserve value, may be partially but not totally overlapping in position. For example, in the string AAAXBB, a first sub-string may be AAAX (first four positions) and the second sub-string XBB (the last three positions) with the "X" in the overlapping fourth position. In this instance, if the non-overlapping portions are not small, the overlapping portion of the two input defined sub-strings may be split out to form a new sub-string. In the above example, the first input defined sub-string AAAX (first four positions) would be replaced with a new first sub-string AAA (first three positions), and a new second sub-string X (the fourth position). The second input defined sub-string XBB (the last three positions) would be replaced with the new second sub-string X (the fourth position) and a new third sub-string BB (the last two positions). The reserve values for the new first sub-string AAA (first three positions) would be the reserve values of the first three positions in the first input defined sub-string. The reserve values for the new second sub-string X (the fourth position) would be the union of all reserve values in the fourth position from both the input defined first and second sub-strings. The reserve values for the new third sub-string BB (the fifth and sixth position) would be the reserve values of the last two positions in the second input defined sub-string.

Method 100 continues with operation 115 of identifying a sub-string with a reserve value. In some embodiments, as stated above, reserve values may be identified before or during the identification of the one or more sub-strings in operation 110. For example, the identified reserve values may be used to identify one or more sub-strings. In some embodiments, the sub-strings may be individually searched instead of searching the string as a whole. For example, a string 44425555552 may have the following sub-string division, 4442-55555-52. Thus, if searched before the sub-string division both a reserve value 4442 and a reserve value 5552 would be found, but if each sub-string is searched individually, then only value 4442 would be found. When and how the string/sub-strings are searched for the reserve value may be tailored for needs of each particular system. In some embodiments, pre-defined or statistical determination of a preferred order of reserve value checking can be utilized to optimize processing. For example, if there are two possible reserve codes with a first code that is in 95% of the strings and a second code in 5% of the strings, the system may examine the string for the first code first since it is more likely to be the code used and save system resources that would be used to check for the second code (e.g., by only checking the second code if the first code returned negative).

Method 100 continues with operation 120 of checking each sub-string for dependent values. In some instances, a dependent variable is a variable whose value depends upon independent variable, for example here one of the obfuscated values. The dependent variable is what is being measured in an experiment or evaluated in a mathematical equation. The dependent variable is sometimes called "the outcome variable." In a simple mathematical equation, for example: a=b/c, where a is a dependent values and b and c are values that may be obfuscated, a reserve values, and/or another number such as a constant. For example, a dependent value may be a check sum such as a modulus 10 check sum. In some embodiments, as stated above, a dependent value may be identified after or during the identification of the one or more sub-strings in operation 110. For example, the identified dependent value may be used to identify one or more sub-strings. In some instances, each sub-string, including superset sub-strings, may be examined to determine if the sub-string contains a dependent value.

Method 100 continues with operation 125 of identifying a sub-string to be obfuscated. In some embodiments, the method and system described is to obfuscate or encrypt intelligent data (e.g., a character string or number) in which there are sub-strings or portions that might have sensitive values. In some embodiments, all sub-strings that do not contain a reserved value or a dependent value may be obfuscated. In some embodiments, sensitive sub-strings that are to be obfuscated may be identified using one or more rules. For example, assuming a rule dictates that any sub-string starting with a letter "A" is to be obfuscated (e.g., based on all account numbers beginning with "A"), if a sub-string is determined to start with "A", then a determination can be made to obfuscate this sub-string. In another example, a placement (e.g., last sub-string in a string) of a sub-string may indicate that the sub-string is sensitive data and should be obfuscated. Other ways of identifying a sub-string that should be obfuscated may be possible.

In some embodiments, a reserve value may be a code that should not be changed or should retain a specific meaning. For example, in account number AAA123, a first sub-string may have a value AAA which is a reserve value. The value AAA may indicate the code is for a checking account, and a testing module may require that account numbers have a code with the type of account. If the account number was randomly obfuscated, it may read 5D7D44, where 5D7 may not indicate an account type.

In some embodiments, the reserve values might be used to indicate special meaning or coding that needs to be reserved or kept while obfuscating other data in the string for security reasons. Following the example from above, for an account number AAA123, 123 may be an identifier sub-string for a certain account. It may be desirable to obfuscate the identifier so it is not recognizable for a testing phase.

Method 100 continues with operation 130 of obfuscating the identified sub-string. In some embodiments, the obfuscation may be a randomization, an encryption, a hash, or a replacement, among other methods of obfuscation. In an example of randomization, a random character generator function may be used to generate a random sub-string the same length as the sub-string. In an example of encryption, an encryption function may be used to encrypt the sub-string such that the original sub-string may only be retrieved by using the encryption key for the encryption function. In an example of replacement, there may be an approved list of replacement sub-strings that may be used to replace the sub-strings that are to be obfuscated.

In some embodiments, the obfuscated value (e.g., obfuscated sub-string) has the same format and consists of the same set of allowable characters as the original value (original value of the original sub-string). In some embodiments, the obfuscated value may be the same length as the original value. In some embodiments, each obfuscated value may be unique for different original values. For example, the system may not simply replace multiple original sub-strings with the same obfuscated sub-string. In some embodiments, each obfuscated value may be calculated independently of the other obfuscated values. For example, the system may not simply replace the values with incremental replacements (1, 2, 3, 4, 5 . . . ). In some embodiments, it may be possible that two sub-strings calculated independently are identical, but it may also be disallowed by the system to have two identical obfuscated sub-strings.

Method 100 continues with operation 135, analyzing the obfuscated sub-string for a reserve value. In some embodiments, after obfuscating a sub-string it is possible that the obfuscated sub-string may match a reserve value. For example, a randomly generated number used as a replacement sub-string, as described above, may conceivably be a reserve value. In some embodiments, if an obfuscated sub-string contains a reserve value, operation 130 may be repeated by obfuscating the identified sub-string again before proceeding to operation 135. In some embodiments, the second obfuscation may be performed on the obfuscated sub-string or the original sub-string. For example, the system may either obfuscate the obfuscated sub-string or revert the sub-string back to the original sub-string and obfuscate it again.

In some embodiments, as an alternative to repeating the obfuscation of the sub-string, an obfuscated sub-string that has been found, in operation 135, to contain a sub-string may be replaced with an ensured value based on the reserve value the obfuscated value was found to have. In some instances, the ensured value is a value that is not a reserve value. For example, a list of progenerated ensured values may be check to ensure that the ensured values to not contain a reserve value. The database of reserve values may include one or more ensured obfuscated values for the reserve values that have previously been checked to ensure that they are not reserve values and/or do not contain reference values. The ensured obfuscated value may be used as a replacement for the obfuscated value that contains the reference value.

Method 100 continues with operation 140 of recalculating the dependent values. In some embodiments, if the dependent values are derived from one of the obfuscated values, the dependent values may need to be recalculated. For example, a modulus 10 calculation may change based on the obfuscation of the sub-string the calculation is based on, thus the modulus 10 calculation may need to be repeated with the obfuscated sub-string to prevent an error.

Figure 2:
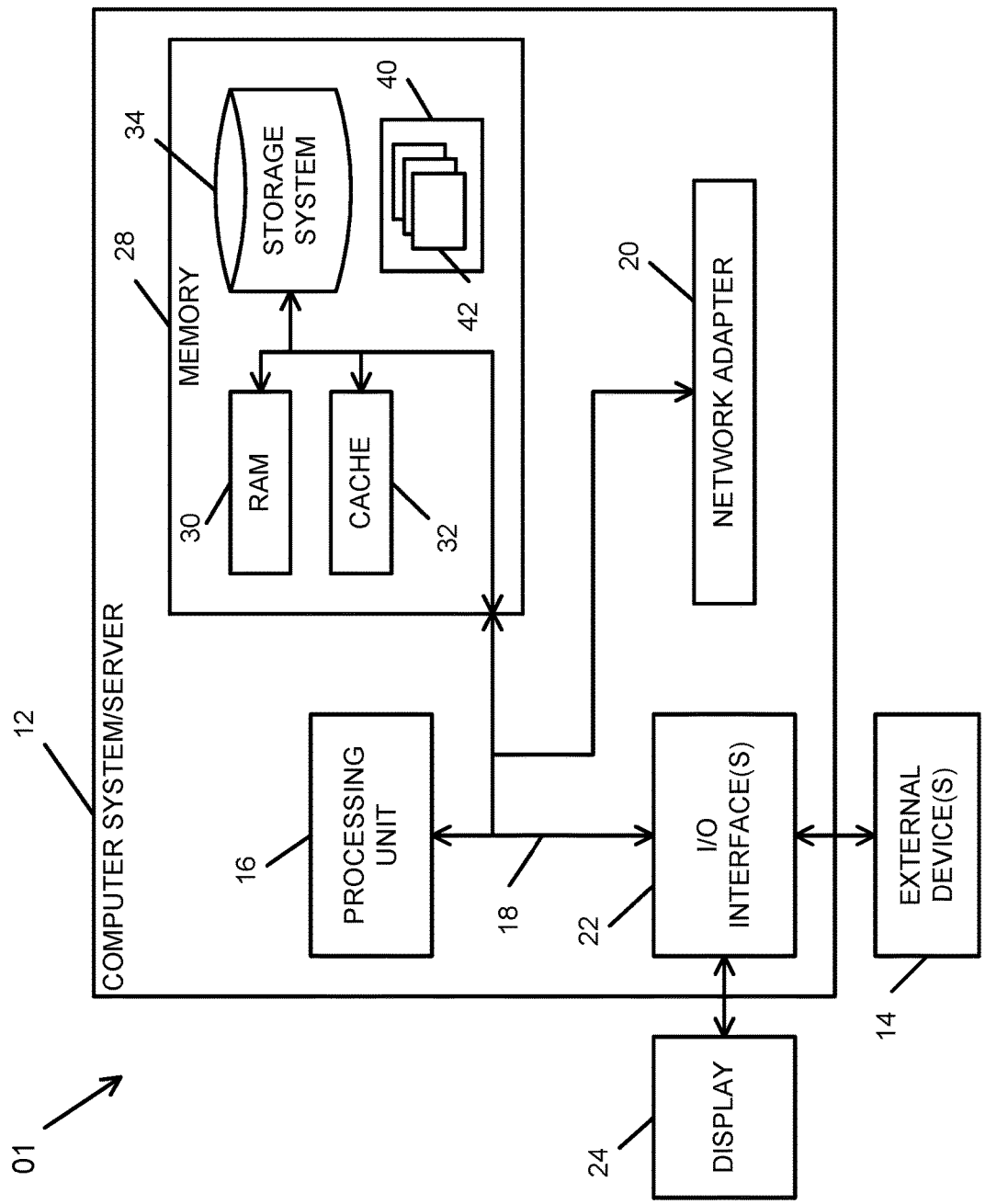
FIG. 2 depicts a computer system according to various embodiments of the present disclosure.

In an exemplary embodiment, the system includes computer system 01 as shown in FIG. 2 and computer system 01 may perform one or more of the functions/processes described above. Computer system 01 is only one example of a computer system and is not intended to suggest any limitation as to the scope of use or functionality of embodiments of the present disclosure. Regardless, computer system 01 is capable of being implemented to perform and/or performing any of the functionality/operations of the present disclosure.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As is further depicted and described below, memory 28 may include at least one program product having a set (e.g., at least one) of program modules that are configured to carry out the functions/operations of embodiments of the disclosure.

Program/utility 40, having a set (at least one) of program modules 42, may be stored in memory 28 by way of example, and not limitation. Exemplary program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a memory; and
   a processor in communication with the memory, the processor being configured to perform processes comprising:
      receiving a string of characters;
      identifying two or more sub-strings of the string;
      comparing the two or more sub-strings to one or more reserve values from a database of reserve values;
      identifying a first sub-string of the two or more sub-strings that contains one of the one or more reserve values;
      identifying a second sub-string of the two or more sub-strings with a sensitive value;

obfuscating the second sub-string and not obfuscating the first sub-string;
checking the obfuscated second string for one of the one or more reserve values; and
obfuscating, based on a determination that the obfuscated second string contains one of the one or more reserve values, the obfuscated second string a second time.

2. The system of claim 1, wherein the process further comprises:
replacing, based on a determination that the obfuscated second string contains a reserve value, the obfuscated string with a replacement value based on the reserve value.

3. The system of claim 1, wherein the process further comprises:
identifying a third sub-string with a calculated dependent value; and
recalculating the dependent value based upon the obfuscated second sub-string.

4. The system of claim 1, wherein the identifying the two or more sub-strings further comprises:
identifying the reserve value in the string.

5. The system of claim 1, wherein the identifying the two or more sub-strings further comprises:
receiving one or more rules for the identification of sub-strings; and
applying the rules to the string to identify the two or more sub-strings.

6. A method comprising:
receiving a string of characters;
identifying two or more sub-strings of the string;
comparing the two or more sub-strings to one or more reserve values from a database of reserve values;
identifying a first sub-string of the two or more sub-strings that contains one of the one or more reserve values;
identifying a second sub-string of the two or more sub-strings with a sensitive value;
obfuscating the second sub-string and not obfuscating the first sub-string;
checking the obfuscated second string for one of the one or more reserve values; and
obfuscating, based on a determination that the obfuscated second string contains one of the one or more reserve values, the obfuscated second string a second time.

7. The method of claim 6 further comprising:
replacing, based on a determination that the obfuscated second string contains a reserve value, the obfuscated string with a replacement value based on the reserve value.

8. The method of claim 6 further comprising:
identifying a third sub-string with a dependent value; and
recalculating the calculated dependent value based upon the obfuscated second sub-string.

9. The method of claim 6, wherein the identifying the two or more sub-strings further comprises:
identifying the reserve value in the string.

10. The method of claim 6, wherein the identifying the two or more sub-strings further comprises:
receiving one or more rules for the identification of sub-strings; and
applying the rules to the string to identify the two or more sub-strings.

11. A computer program product comprising a computer readable storage medium having program instructions embodied therewith, the program instructions executable by a processor to cause the processors to perform a method, the method comprising:
receiving a string of characters;
identifying two or more sub-strings of the string;
comparing the two or more sub-strings to one or more reserve values from a database of reserve values;
identifying a first sub-string of the two or more sub-strings that contains one of the one or more reserve values;
identifying a second sub-string of the two or more sub-strings with a sensitive value;
obfuscating the second sub-string and not obfuscating the first sub-string;
checking the obfuscated second string for one of the one or more reserve values; and
obfuscating, based on a determination that the obfuscated second string contains one of the one or more reserve values, the obfuscated second string a second time.

12. The computer program product of claim 11, the method further comprising:
replacing, based on a determination that the obfuscated second string contains a reserve value, the obfuscated string with a replacement value based on the reserve value.

13. The computer program product of claim 11, the method further comprising:
identifying a third sub-string with a calculated dependent value; and
recalculating the dependent value based upon the obfuscated second sub-string.

14. The computer program product of claim 11, wherein the identifying the two or more sub-strings further comprises:
identifying the reserve value in the string.

* * * * *